April 30, 1946. F. H. AMON 2,399,591
METHOD AND APPARATUS FOR PRODUCING CARBON BLACK
Filed May 7, 1941
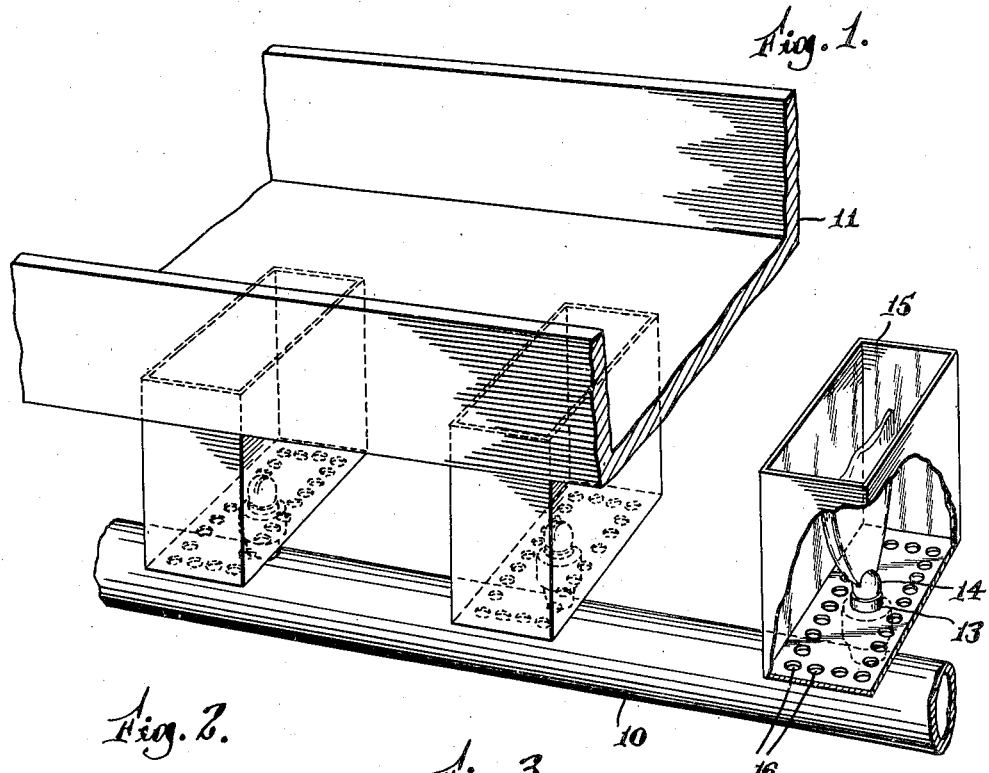
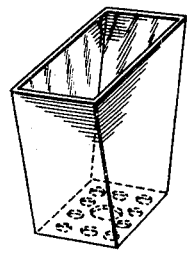
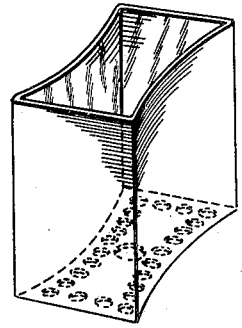
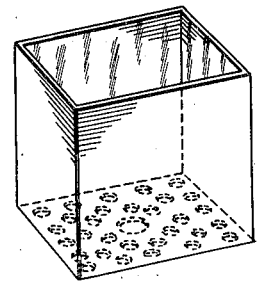
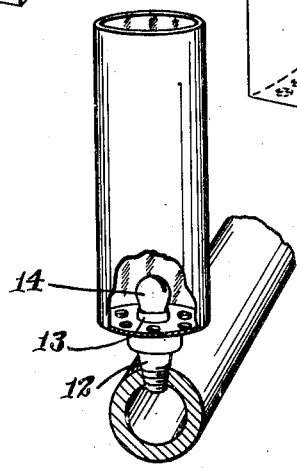
Inventor
Fred H. Amon
by Kenway & Witter
Attorneys Patented Apr. 30, 1946

2,399,591

UNITED STATES PATENT OFFICE 2,399,591

METHOD AND APPARATUS FOR PRODUCING CARBON BLACK

Fred H. Amon, Weston, Mass., assignor to Godfrey L. Cabot, Inc., Boston, Mass., a corporation of Massachusetts Application May 7, 1941, Serial No. 392,292

6 Claims. (Cl. 23—209.8)

This invention relates to the production of carbon black by the impingement process, that is, by the impingement of a gas flame against a metal surface relatively much cooler than the flame itself, thus causing carbon black to be deposited on that surface.

In one aspect, my invention comprises an improved process of producing impingement carbon black, characterized by shielding the gas flame so that it will remain steady in spite of irregular air currents which would otherwise reach the flame. The process of my invention, when carried out in the preferred manner, is characterized by the step of reflecting back into the flame the radiant energy generated by that flame and which would otherwise pass off laterally and be wasted. In still another aspect my invention comprises a device for regulating with great delicacy the amount and direction of flow of air admitted to the environment of the flame. I have found that by my new and improved process, I can obtain more carbon black per cubic foot of gas burned than heretofore, or carbon black possessing an unusual and desirable combination of physical properties, or both.

Carbon black is extensively used in compounding rubber for use in tires and other products. It has a valuable effect in improving wearing quality, particularly the resistance to abrasion, of such products. The application of my invention to the impingement process for the manufacture of carbon black can cause either an increased yield of a standard quality of rubber black, or the production of a quality of rubber black having unusual and valuable combinations of curing, processing, and reinforcing properties in rubber.

It has long been recognized that carbon black formed by the impingement process is created within the gas flame by the thermal effect of the very high temperature luminous sheath of that flame on the unburned gas remaining within that sheath. It is further well understood that the oxygen of the air which causes the combustion of the outer sheath of the flame likewise does penetrate in one form or another into the flame and combine with the carbon black as it is being formed and deposited, with the result that the deposited carbon contains a substantial percentage of oxygen or oxygen-containing compounds. It is understood in a general way that excessively high percentages of oxygen in deposited carbon black tend to cause abnormal and undesirable reactions in the latter use of that carbon black in rubber compounding.

While I do not fully understand the reason for the commercially desirable results which are obtained by the use of my invention, it seems likely to me that one of its principal effects may be to steady the flame by preventing lateral or variable air currents in the near vicinity of the flame, thus causing more perfectly laminar flow conditions between the inner parts of the flame in which carbon is formed and the outer sheath in which the natural gas burns completely and thus provides the heat units necessary for the gaseous decomposition within the envelope of air and burned gases. This desirable condition is promoted by a smooth flow of the surrounding air which, through forces of convection, rise around that envelope.

I have also discovered that the yield of carbon black from an impinged flame may be increased, or desirable combinations of qualities obtained in the resulting carbon black, or both, by providing the shield with a surface specially designed and selected to reflect radiant energy and so located as to direct the outward-bound radiant energy of the flame back again into the zone of combustion and reaction, thus producing still greater yields of carbon black and apparently promoting a greater degree of thermal decomposition than would otherwise normally occur and in this way securing a different product.

I have also discovered that by the use of my invention, I can control the area and the topography of the thin layer of carbon deposited on the impinged surface, thus reducing in a degree, the amount of carbon black which otherwise fails to impinge and passes off as smoke, and also it may be that such uniform deposition is a factor in controlling the uniformity of the quality deposited and later collected.

It is readily apparent that the configuration of the shield or reflector used is important since thereby the shape of the flame, the direction and velocity of the currents of gas external to the flame, and the return of radiant energy to the flame are controlled.

These and other features of the invention will be best understood and appreciated from the following description of an apparatus employing shields of preferred types selected for purposes of illustration and shown in the accompanying drawing in which:

Fig. 1 is a view in perspective of a portion of an apparatus constructed according to my invention.

Figs. 2, 3 and 4 are views in perspective of differing types of shields employable in the apparatus illustrated in Fig. 1, Fig. 5 is a view partly in section of a cylindrical shield, with a fragment broken away to show details of the burner tip.

The apparatus shown in Fig. 1 is conventional except for the presence of shields required by my invention. A horizontal supply pipe 10 for natural gas is placed beneath and parallel to a U-shaped channel iron 11. Tapped into the top of the supply line 10 is a series of burners (see Fig. 5) each of which comprises a hollow mount 12 screwed into the pipe 10, a collar 13 integral with the mount 12, and a tip 14 screwed into the collar 13. When a stream of hydrocarbon gas is introduced into the pipe 10 and the burners lighted, gas flames will play upon the under surface of the channel iron 11, and consequently carbon black will be deposited thereon from the flames. At regular intervals of time the channel iron 11 is moved longitudinally over a scraper and the carbon black is removed and collected for screening and packing.

In Fig. 1 a rectangular metal shield 15 is shown in position resting on the collar 13 and embracing the base of each tip 14. The tip is slotted to produce a relatively thin upwardly flaring flame and the wider dimension of the shield is in the side walls which are parallel to the wide faces of the flame. The shield may be made of metal or other non-inflammable material. It is provided with a rectangular bottom having numerous draft holes 16 therein through which air reaches the flame without disturbing component of flow. The amount of air so admitted may be varied by increasing or decreasing the number of holes 16 in the bottom of the shield 15. In practice it has been found that it is necessary to admit within the shield considerably more air than the theoretical quantity necessary to burn the gas issuing from the enclosed top. Twenty-four ¼" diameter holes have proved adequate in practice.

When a shield of the shape shown in Fig. 1 and constructed of black iron is employed the yield of carbon black is increased about 17% as compared to the yield of carbon black from the same unshielded burner tip. For example, a yield of 1.75#/M is increased to 2.05#/M.

When, however, the inner surface of the shield 15 is made highly reflective of radiant energy a further increase in yield is achieved. For example, when the shield is constructed of aluminum the yield is increased from 1.75#/M to 2.45#/M. An iron shield of the shape shown in Fig. 1 having an interior coating of aluminum paint when used results in an increase of carbon black yield from 1.75#/M to 2.35#/M, that is to say, an increase of 34%. A similar shield constructed of "Transite" ¼" thick and coated internally with aluminum paint results in an increased yield of 40%. The employment of a shield of stainless steel (Allegheny 55 c.b.) results in an increased yield of 34.8%. Bright or highly polished metal surfaces in the shield show similar desirable results.

Several types of shields have been experimented with, and the five types illustrated in the drawing have been found to produce novel and useful results in respect to yield or quality or both. I have found that the most effective configuration for the shield should take into account the configuration of the tip from which the gas issues and the shape of the flame in which it is burned. For these and other reasons, I do not limit myself to the types illustrated in the drawing attached hereto.

The shield 15 shown in Fig. 1 is rectangular in shape and is related to the type shown in Fig. 3, which is substantially rectangular, having its two long sides bowed inwardly. The shield illustrated in Fig. 4 is cubical, and that in Fig. 5 is cylindrical in shape. It is to be noted that all of the different types of shields have draft holes in the bottoms, and side walls that extend below the base of the burner tips and may be provided with inner reflecting surfaces. They are attached to the burners in the same fashion as the shield 15 above described and their inner walls may or may not comprise reflecting surfaces. While the illustrated shields are designed for individual burners, it is contemplated that a single shield may be so designed as to serve two or more burners. Each of the shields shown has a marked effect in molding the flame it encloses, probably by governing the shape of the surrounding sheath of air, its volume being determined by the draft holes in the base of the shield.

When the flame is of the flat fish-tail shape shown at the right side of Fig. 1 a frusto-pyramidal shield of the character shown in Fig. 2 may be employed most advantageously. This shield has a flat perforated bottom which is substantially square and is located below the level of the burner tip when in operative position. It is of substantially uniform width but flares longitudinally toward its upper end. Its long flat faces are disposed opposite to the flat sides of the flame and the shield as a whole flares upwardly in general conformity to the shape of the flame. The entire inner surface of the shield may be brightly polished and it will be noted that since its walls are located close to the flame a very high percentage of the radiated energy of the flame is reflected back into it.

Tests made in order to determine the approximate increase in yield due to the use of the shielded burner tips show increases ranging from 7% to 40% over the yield obtained from an unshielded tip under otherwise similar conditions. They also indicate a decrease in the volatile content of the carbon black which is of the order of 1% or 2%. Further tests show that rubber compounded with carbon black obtained from shielded burners displays a resistance to abrasion which was 11% to 12% better than that displayed by rubber compounded with ordinary carbon black.

While I am unable to give a complete explanation, the fact remains that carbon black produced by the novel process of my invention is less highly absorptive of sulphur and the accelerating agents used in the manufacture of tires than carbon black heretofore produced in commercial manufacture. This, of course, is a valuable characteristic for carbon black used in the rubber industry. It may be the result of a reduction of the oxygen content of the carbon black, or it may be the result of a difference in particle size, but, whatever the explanation, the beneficial results described may be attained by the practice of the novel process herein disclosed.

The present application is a substitute for my earlier application Ser. No. 193,941, filed March 4, 1938, the disclosure of that earlier application being somewhat amplified herein.

Having thus described my invention, what I claim as new and desire to secure by Letters Patent of the United States is:

1. Apparatus for production of carbon black which comprises a gas supply line, a plurality of burner tips connected to said supply line, a substantially frusto-pyramidal shield disposed, small end down, around each burner tip with its side walls arranged to shield the flame issuing therefrom and provided above the supply line and below the burner tip with a plurality of draft holes, and a member above the flame and in close proximity thereto presenting a cooling surface against which the flame may impinge.

2. Apparatus for producing carbon black, which comprises a gas supply pipe, a plurality of burner tips projecting above the pipe, an individual rectangular shield for each tip having a flat perforated bottom disposed above the supply pipe and below the base of the tip and side walls rising about and above the tip and adapted to protect the flame issuing from the burner tip, and a member above the flame and in close proximity thereto presenting a cooling surface against which the flame may impinge.

3. In a process of producing carbon black by impingement process wherein a gaseous fuel is incompletely burned forming a flame the top of which is directed against a solid carbon collecting surface for the deposition of carbon on such surface, the improvement which comprises directing substantially all of the air supply for the flame to the flame in a direction substantially parallel to the direction of the flame, without directing any portion of the air toward the axis of the flame so as to cause it to impinge on the flame, by passing said air between spaced substantially parallel guide walls extending substantially vertically from a point substantially below the base of the flame to a point substantially above the base of the flame but not to the collecting surface while maintaining a flame of such a size and shape that contact of the flame with the guide walls or alteration of the normal shape thereby is avoided prior to the impingement of the top of the flame on the carbon collecting solid surface.

4. In the method of producing carbon black by the impingement process employing a burner supplying a flame of burning gaseous fuel, a solid flat metallic carbon collecting surface upon which the top of the flame impinges and deposits carbon and a shed enclosing said burner and solid surface and supplying air to the flame, the improvement which comprises directing substantially all of the air supply for the flame from outside of and below the burner up to the flame in a direction substantially parallel to the direction of the flame, without directing any portion of the air toward the axis of the flame so as to cause it to impinge on the flame, by passing said air between spaced substantially parallel guide walls extending substantially vertically from a point substantially below the base of the flame to a point substantially above the base of the flame but not to the collecting surface while maintaining a flame of such a size and shape that contact of the flame with the guide wall is avoided prior to the impingement of the top of the flame on the carbon collecting solid surface.

5. Apparatus for the production of carbon black which comprises a gas supply line, a plurality of burner tips connected to said supply line, a substantially imperforate shield having straight substantially vertical side walls, extending around and substantially above and below each burner tip, said shield being so constructed as to prevent air being laterally directed into the flame and to cause laminar flow in the flame zone and between the flame and walls of the shield, and a member arranged at such height above the tips as to present a cooling surface against which the flame may impinge.

6. Apparatus for the production of carbon black, comprising a gas supply line, a plurality of burner tips connected to said supply line, a substantially imperforate shield having walls extending around and below the level of the burner tips, said shield including side walls that flare outwardly and upwardly from the gas supply line and being constructed and arranged to prevent air from being laterally directed into the flame and to cause laminar flow in the flame zone and between the flame and the walls of the shield, and a channel iron located at such a height above said tips as to present a cooling surface against which the flame may impinge.

FRED H. AMON.